United States Patent [19]

Porath

[11] Patent Number: 5,141,966
[45] Date of Patent: Aug. 25, 1992

[54] METALCHELATING, HYDROPHILIC POLYMER

[75] Inventor: Jerker Porath, Lidingö, Sweden

[73] Assignee: Exploaterings AB T.B.F., Uppsala, Sweden

[21] Appl. No.: 625,399

[22] Filed: Dec. 11, 1990

[30] Foreign Application Priority Data

Dec. 19, 1989 [SE] Sweden ............................ 8904258

[51] Int. Cl.$^5$ .......................... B01J 37/08; B01J 39/18
[52] U.S. Cl. ................................ 521/32; 423/DIG. 14;
521/25; 521/33; 521/34; 521/35; 521/36;
521/37; 525/61; 525/329.4; 525/329.7;
525/329.8; 525/329.9; 525/420; 536/56;
536/102; 536/112
[58] Field of Search ..................... 521/25, 32, 30; 525/420, 61

[56] References Cited

U.S. PATENT DOCUMENTS

| 3,582,505 | 6/1971 | de Jong | 521/32 |
|---|---|---|---|
| 3,899,472 | 8/1975 | Aya | 521/32 |
| 4,230,828 | 10/1980 | Gaul, Jr. | 525/153 |
| 4,281,086 | 7/1981 | Gaul, Jr. | 525/330 |
| 4,330,642 | 5/1982 | Gaul, Jr. | 525/337 |
| 4,423,158 | 12/1983 | Porath | 521/32 |

Primary Examiner—Joseph L. Schofer
Assistant Examiner—Fred Zitomer
Attorney, Agent, or Firm—Armstrong & Kubovcik

[57] ABSTRACT

The invention concerns a polymer product for immobilizing of metal ions, adsorption, and the like, with the structure

P—X—A—Q wherein P is a hydrophilic polymer with a molecular weight of more than 3 000 Daltons. X is a heteroatom, O, S or N, A is an atom sequence with at least 3 carbon atoms, and Q is a group with at least two branches with terminal, metal, metal chelate forming substituents, each having at least two hetero atoms, N, O or S, separated by two or at most three carbon atoms in a sequence or Q is a macrocyclic ring with at least 8 and not more than 30 atoms, at least 3 of which are nitrogen atoms, in sequence in the ring, and the preparation thereof which is done by activating a hydrophilic polymer with epoxi or vinylsulfone or inserting of aldehyde groups, couupling with tris-(2-aminoethyl)-amin and treating with reagents chosen from α-haloalkanoate, α-holoalkanoylhalogenide, o-amino- or hydroxysubstituted aromatic or heteroaromatic aldehyde, dialdehyde or diketone and ring-closing of at least two terminal N with a bridge.

14 Claims, No Drawings

METALCHELATING, HYDROPHILIC POLYMER

The invention concerns a polymer for anchoring of metal ions in a hydrophilic polymer and includes ligands, free or bond to the hydrophilic polymer for adsorption and/or immobilizing of foremost di- and polyvalent metal ions.

For many reasons it is of great interest to anchor metal ions firmly to ligands which may be bound to insoluble and water soluble polymers, especially hydrophilic ones. Such polymers are described in several of the inventor's own patents.

Hydrophilic polymers are defined by C.A. Finch in Speciality Polymers, Blackie, Glasgow and London 1987, page 65: "Hydrophilic polymers are those polymers which dissolve in, or are swollen by water".

The invention includes such hydrophilic polymers which are insoluble but swellable in water or which are dissolved in water in a definable way, e.g. <1 % by weight are dissolved in water at an ambient temperature of 20° C.

The hydrophilic polymers can be divided into three main groups,
  a) natural polymers, almost all of which are based on carbohydrates or proteins,
  b) semisynthetic polymers, based mainly upon celluloses, paper pulp or cotton linters which have been reacted with functional chemicals of petrochemical origin, epoxides, vinylsulfones, isocyanates, etc.
  c) synthetic polymers prepared by polymerisation of monomers of petrochemical origin.

Besides these main groups, there also can be subgroups d), compromises between c) and a) or c) and b), which as well as a), b) and c) may be adsorbed or chemically bound to solid materials such as silicates or hydrophobic polymers.

The hydrophilic polymer can be
1) water soluble
2) water insoluble but swellable in water.

The water insoluble polymer 2) can have different physical shapes, e.g. as
  2a) particles,
  2b) fibers, isolated or as cloth or paper,
  2c) membranes e.g. of substituted cellulose,
  2d) tubes e.g. capillaries,
  2e) surface layers in walls,
  2f) spongy masses, etc.

The hydrophilic polymer can have different chemical structure, e.g.,
3) be a polyhydrate
  i.e. contain a great number of hydroxyl groups, e.g. at least one hydroxyl group per monomer unit.

A polyhydric polymer useful according to the invention is
3a) a polysaccharide or a cross-linked polysaccharide
  I. cellulose or cellulose derivatives
  II. starch or starch derivatives
  III. agar or agarose
  IV. cross-linked dextran or dextran derivatives
  V. polyethylene glycol
3b) polyvinyl alcohol or derivatives thereof,
4) polyacrylates or polyacrylamides including cross-linked derivatives
5) mixed polymers of one or more of the groups 1-4.
6) silica gels hydrophilized by epoxy silanes.

The chemistry of the polymer is so adapted that it and/or its derivatives according to the invention
  a) can be dissolved with at least 1% in water at ambient temperature or swelled and taken up in water with at least half the weight of the polymer,
  b) contains functional groups to which ligands according to the invention can be coupled directly or indirectly.

Direct coupling can be done e.g. if the polymer contains epoxy groups or primary amino groups and indirect coupling if the reactive groups can be inserted via functional groups in the polymer, e.g. hydroxyl or amino groups. To be soluble or swellable in water the polymer must contain a great number of polar groups, e.g. hydroxyl groups, amino-carbamino groups or less effective ether groups.

Polysaccharides, polyacrylates, polyvinylalcohol, polyacrylamides, polyalkyleneglycols, especially polyethyleneglycol belong to these classes.

The shape of the product according to the invention may be chosen optionally depending on the desired use, e.g. particles for chromatography, compressed filter masses, paper, membranes or particles for discontinuous adsorption, soluble polymers for liquid-liquid extraction, surface coating of a solid impermeable phase. Particles which are impermeable to metal ions etc. and coated by a gel film of polymer according to the invention are of interest for analysts and for medical diagnostics.

According to one form of the product a solid, hydrophilic or hydrophobic nucleus is surrounded by a mono- or multimolecular film and the ligand is fixed to this film. By using metal ions as crosslinkers, matter from the surrounding solution can be bound if these matters have affinity to metal ions. As an example of the use, the following pattern of a wall in a tube or a vessel in an extra-corporeal shunt can be cited.

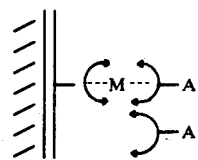

Figure 1

Hydrophilic film with surface coated metal binding ligands as in the invention

—A is for example heparins to which a single metal binding group has been coupled wall (nucleus) impermeable for heparin Variations are possible, e.g. for diagnostic reagents, at which A may be an antibody or antigen-antibody complex.

A variant of the invention is water soluble. The characteristic fork branched or macrocyclic ligand then is covalently bound to a hydropolymer, e.g. dextran, dextrin, soluble derivatives of cellulose or starch, not crosslinked polyvinyl alcohol, etc. One example of a suitable ligand is cyclam, 1,4,8,11-tetraazacyclotetradecane.

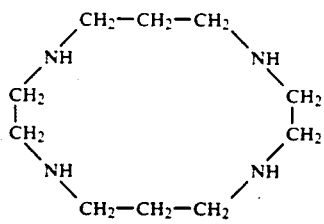

One other example is 1,5,9-triazacyclododecane.

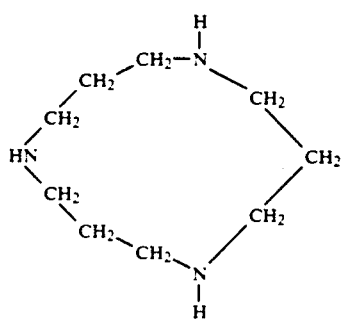

Polyetherglycols and polypropyleneglycols

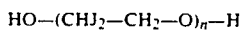

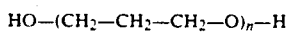

as well as poly-(2-methylpropylen)-glycol ethers

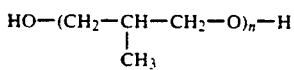

have limited water solubility with two terminal hydroxyl groups where substitution of the molecule may occur. From polyethyleneglycol it will thus be possible to make monoterminally substituted or diterminally substituted derivatives with metal binding fork ligands or macrocyclic ligands, e.g with a monosubstituted macrocyclic ligand

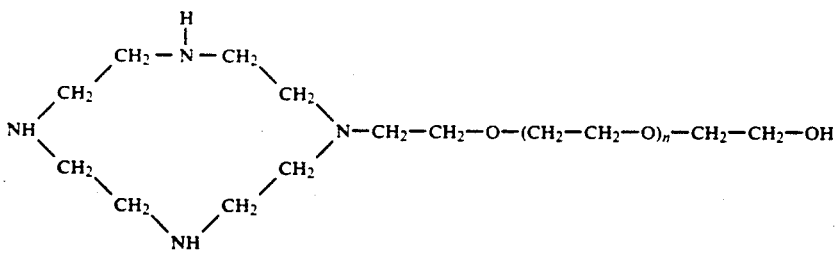

or with diterminally substituted fork ligand e.g.

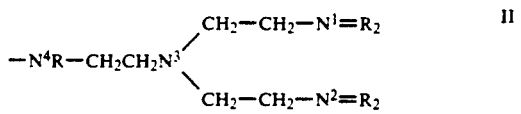

Such soluble derivatives according to the invention have other uses than the water insoluble, only swellable derivatives. They may e.g. be used as modifiers in polymeric phase systems to insert metal ion affinity as separation principle for extraction, as constrictors by adsorption and for coating of surfaces with fixed metal ions.

The invention is characterized in that the ligands comprise at least 3 hetero atoms e.g. amino groups separated by aliphatic chains —$(R_2)_n$— where R is H or alkyl, preferably H, and n is 2 or 3, whereby the anchoring in a polymer occurs to generate a fork formed ligand: The N in the branching point is encountered as a heteroatom in each of the branches.

$$P-N^4H-CH_2-CH_2-N^3 \begin{matrix} CH_2-CH_2-N^1 \\ \\ CH_2-CH_2-N^2 \end{matrix} \quad (I)$$

All the N atoms $N^1$, $N^4$ can bind transition metals of the type $Cu^{2+}$, $Ni^{2+}$, $CO^{2+}$, $Zn^{2+}$, and further $Hg^{2+}$, platinum metals, $Ag^+$, etc coordinately but the terminal nitrogen atoms have the utmost inclination to coordinate for steric reasons.

According to the invention the inclination to coordinate around $N^1$ and $N^2$ will be strengthened in two ways
 by a bridge $R^5$ effected between $N^1$ and $N^2$ to create a ring system, or
 by substituting groups R with at least one coordinating atom, O, N, or S into $N^1$ and/or $N^2$.

In the first mentioned ring system metals are bound firmly to the nitrogen atoms and other coordinating atoms (O,N,S) in the bridge between $N^1$ and $N^2$, According to a variant of the invention by comprehensive alkylation the ligand will give the structure $$-N^4R-CH_2CH_2N^3 \begin{matrix} CH_2-CH_2-N^1=R_2 \\ \\ CH_2-CH_2-N^2=R_2 \end{matrix} \quad II$$

where R stands for substituents containing at least one coordinating N, O or S atom. Example of R is here

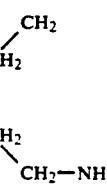

$CH_2$—COOH.

Thus here is a sterically very advantageously formed group of coordinating atoms of the same kind as in EDTA, ethylenediamino tetraacetic acid, whereby the binding effect is also strengthened by $N^3$ and $N^4$ and by the carboxymethyl group upon $N^4$. A product made by coupling of tris-(2-aminoethyl)-amin to agarose and other polymers followed by treating with bromoacetate at pH 10 has resulted in a product which binds copper ions extremely firmly.

A product with greater specificity of the metal affinity can be produced if other substituents than R are chosen, and many compounds having known metal binding characteristics are suitable as substituents.

The fork branched structure of the ligand herein also results in a strengthening of the metal ion bonds. The difference of the bond strength between free and bound ligand groups will be clear from the following approximative calculation From a bidentate ligand and a hexavalent metal ion a "tricomplex" can be established in a free solution.

III

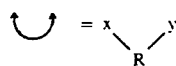

wherein x and y are electrophilic N, O or S.
Then III will be

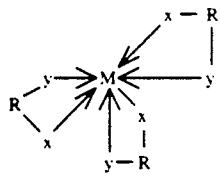

IV

If 

is anchored in a polymer only

V

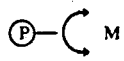

can be formed.
If the formation constant of III is e.g. $10^{18}$, it will be approximatively $$\sqrt[3]{10^{18}}.$$

i.e. $10^6$ for V. This is a weakening of $10^{12}$, i.e. one trillion times.

By a fork formed, composited ligand with two

an immobilized chelate structure is obtained.

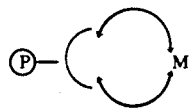

VI

Here, the formation constant is approximately $$\left(\sqrt[3]{10^{18}}\right)^2 = 10^{12},$$

i.e. a magnification of V one billion times. By a fork with three branches it is thus possible to reach a formation constant of $10^{18}$ or been more. This is only an exceedingly rough estimation, but the fixation of the polymer might increase the binding or complex constants by the change of entropy, which proves the bearing capacity of the argumentation. This emphasizes the importance of the ligand fixation and the unique qualities of the metal immobilizing product.

The above is of course applicable to all kinds of fork branched ligands.

An advantage of aldehyde with respect to ketone condensation is a more accurate control of the reaction product. With RCHO it is possible to obtain

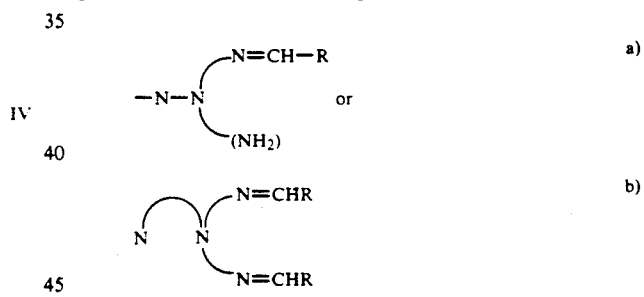

We want to get b) and not a) or a mixture of a) and b). By using a great excess of RCHO we can increase the amount of produced b).

Also we can substitute the NH-groups by a substance containing an "electrophilic" group, e.g. an epoxy group, an active halogen, and so on. With bromoacetate we will obtain e.g.

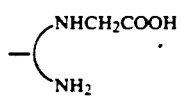 c)

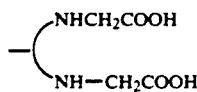 d)

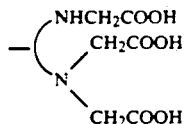 e)

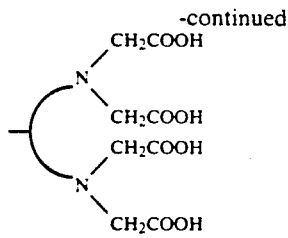

We want to obtain f) and therefore we treat the original amino ligand with a great excess of bromoacetate in alkaline environment.

From a simple aldehyde or ketone a product is formed according to the "fork variant" e.g. with salicylic aldehyde.

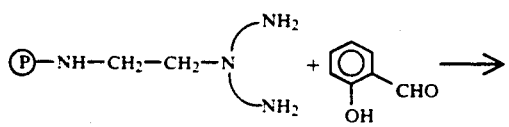

IX

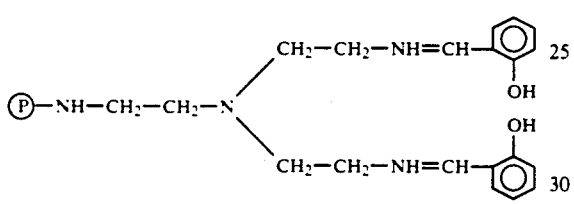

In the "Salenligand" which is a Schiff's base the double bonds can be reduced away with sodium boronhydride.

With 8-hydroxy-quinoline-carbaldehyde is obtained

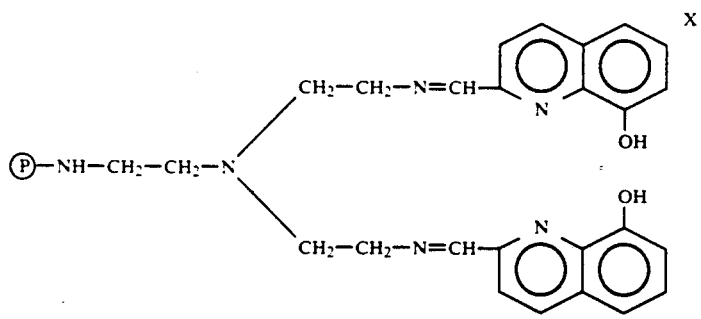

X

This "double oxine" liganded variant of the invention is used as a metal adsorbent.

The invention concerns a product where the ligand has been fixed to the polymer during the synthesis by way of acid ether and/or an amino or imino group and if necessary also a thioether group, and therefore is founded upon a starting material which can be synthesized simply and can contain also adsorption increasing structures (e.g. amino N). It is also possible to couple amino-derivatives to N-terminals by way of isocyanate, isothiocyanate or cyanamide.

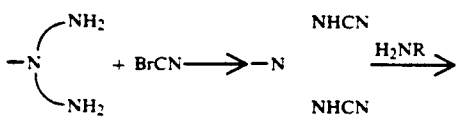

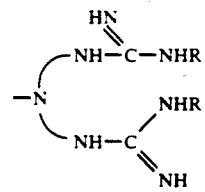

but most likely there will be a ring closing in such cases.

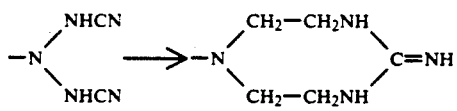

The formed metal complexes will be weaker with only 8 atoms in the ring but can be considerably strengthened by carboxymetylation.

A suitable synthesis method for the product according to the invention comprises 1, 2 or 3 steps outoing from a hydrophilic gel containing reactive groups, e.g. epoxy groups, isocyanate, vinylsulfone, or active halogen. A preformed macrocyclic compound having at least three aliphatically bound aminogroups is e.g. reacted with the epoxypolymer. The macroheterocyclic ligand fixed in the polymer can thus be alkylated, carboxylated, etc. to further increase the adsorption capacity of the product.

According to another synthesis method the tris-(2-aminoethyl) -amin can be condensed to a polymer containing aldehyde groups, e.g. periodate oxidized starch, "aldehyde starch" and thereafter be reduced for stabilisation. This can be described schematically

VII

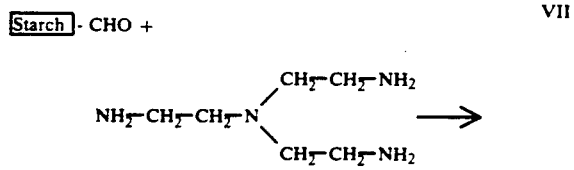

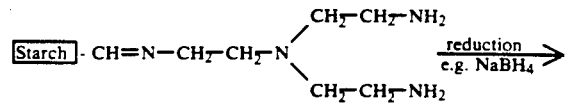

-continued

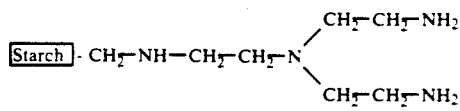

whereafter the two primary amino groups are substituted.

A fork formed ligand can contain additional branches. Such should be considered a variant of the invention. An example is

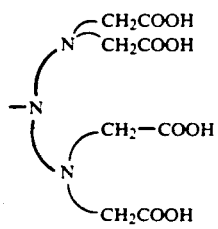

but it is difficult to get three branches from the same fork point. Theoretically it can be done from nitrogen, but then a +charge is obtained.

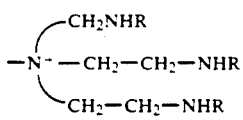

It is possible to obtain this structure by certain reaction conditions with small amounts of tris-(2-aminoethyl)-amin (in a strongly alkaline environment).

That just the structure

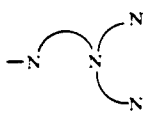

is so outstanding depends on the accessibility of the symmetrical tris-(2-aminoethyl)-amin with three symmetrically located primary aminogroups

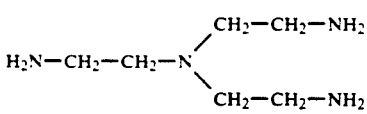

The primary aminogroups are sites of application ("nucleophilic") for reacting with polymer activated with epoxygroups, etc. If the active groups are not located too near each other in the polymer, as is usual only one amino group reacts and the compound will be anchored to the polymer by a side chain and form a fork branched ligand with the tertiary nitrogen as fork point and the unreacted primary aminogroups as terminals. Thus an intermediate product is obtained,

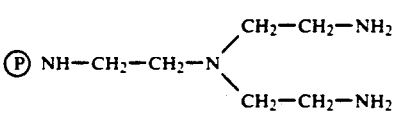

with 4 heteroatoms, nitrogen atoms, which can coordinate a heavy metal, e.g. $Cu^{2+}$. The metal binding however is too weak and will be outdone by many soluble, relatively weak, chelate forming substances and the metal bond therefore must be strengthened. The ring closing increases the capacity of the nitrogen atoms which together bind and fix certain heavy metals such as $Ni^{2+}$, $CU^{2+}$, $Zn^{2+}$, and others. Another method to increase the metal binding capacity is the "building up" of the branches by fastening substituents having suitably located "nucleophilic" hetero atoms, N, O and S. This enlargement can be done with different reactions, e.g. by condensing the aminogroups with aldehydes or ketones, whereby so-called Schiff's bases are formed. It is easiest and most effective to have only one kind of aldehyde or ketone present in the reaction mixture, whereby symmetrical branches are obtained, which facilitate the developing of strong metal complexes (symmetrical). The condensation product contains double bonds and establishes equilibrium with the starting-intermediate product. It can be stabilized by reduction whereby the double bond disappears and the metal binding ability is somewhat diminished. In the stated examples the ability to bind e.g. copper ions however is very strong, often so strong that the metal ion cannot be eluated by the strong, soluble complex former EDTA, ethyleneaminotetra-acetate.

A further method to make fork ligands with N and phenolic OH in the correct position has been shown effective.

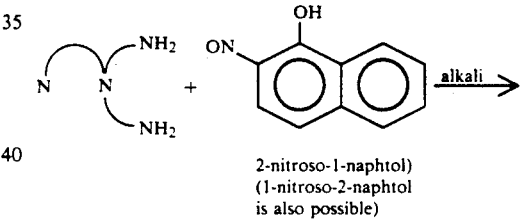

2-nitroso-1-naphtol)
(1-nitroso-2-naphtol is also possible)

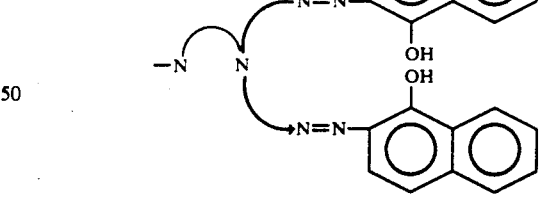

a bis-azocompound will give the corresponding hydrazocompound after reduction

These gels will give extraordinarily strong green copper-complexes. The substances are outside the scope of the other compounds in that two nitrogen atoms in each branch are not separated from each other by 2 or more C-atoms but are vicinal. Other similar nitroso compounds give similar complexes, e.g. o-nitrosophenol.

Other starting materials are also possible for the same or similar fork formed ligands e.g.

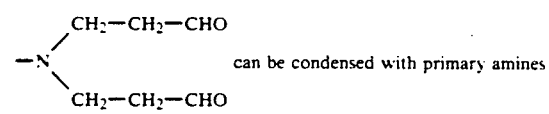

can be condensed with primary amines e.g. 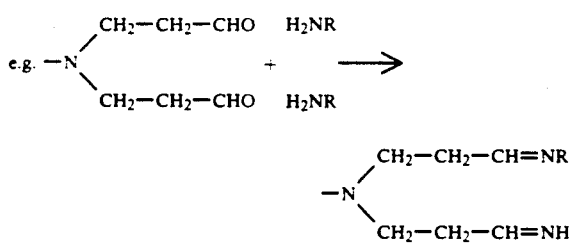

For this there must be accessible

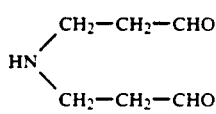 A)

probably with the aldehyde groups blocked during the coupling after which they are deblocked (in a strong acid) before the condensation. As far as is known substance A is not commercially accessible.

Another possibility is

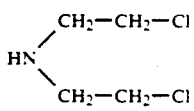 B)

This is so-called nitrogen mustard, a strongly acting cell-poison. Here B) must be reacted with a chelating agent before the coupling of the product to the polymer, e.g.

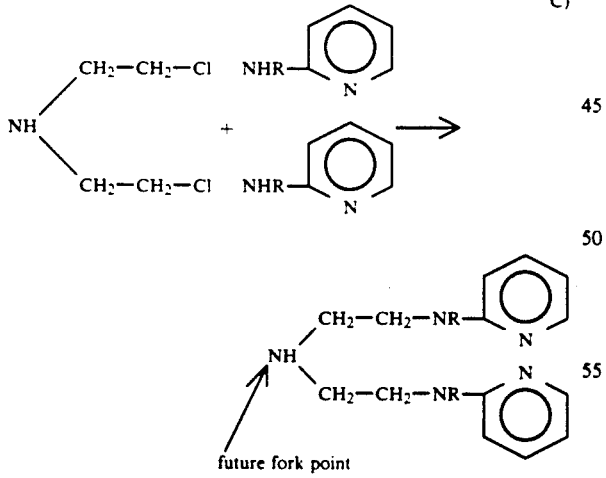

whereafter C) is coupled into the polymer. This is a practicable but complicated method and varieties are possible.

It is also conceivable but now not practical is to use a trifunctional reagent, e.g. trisepoxide, which can be produced from glycerol and epichlorohydrin.

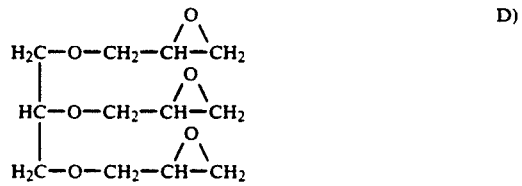 D)

Polymer + D) ⟶ E)

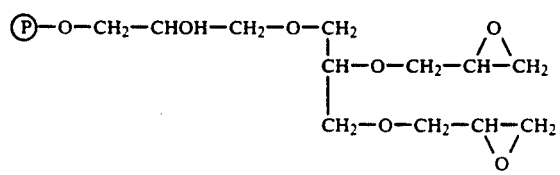

In some of the following formulas, the hypothetically imagined metal coordination is indicated.

E) + suitable chelating agent e.g.

E) +

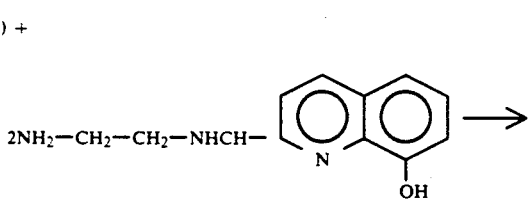

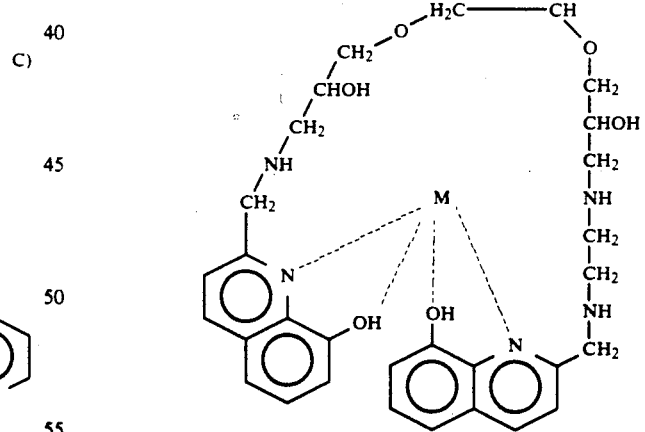

Here is a fork but the fork point is a carbon atom.

It is also possible to use another method to get the "fork arm", e.g.

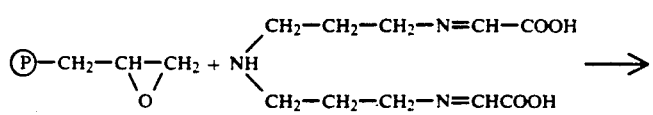

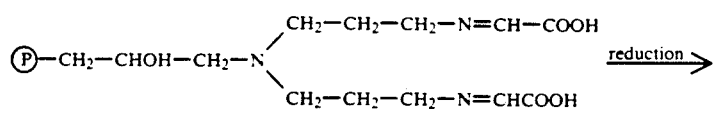
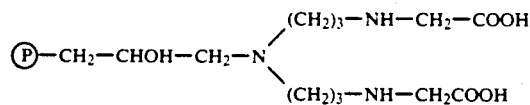
or macro cycle, e.g.
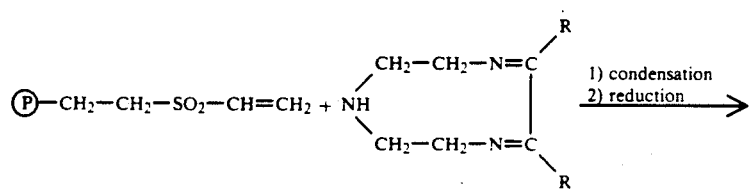
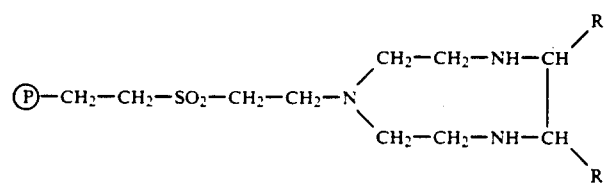
Examples of ligands
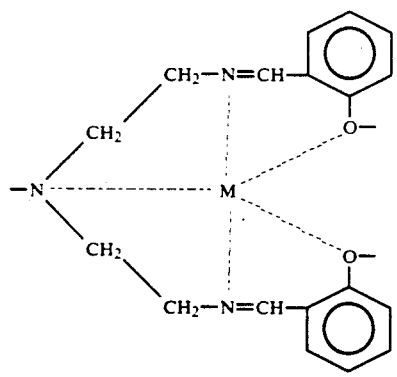
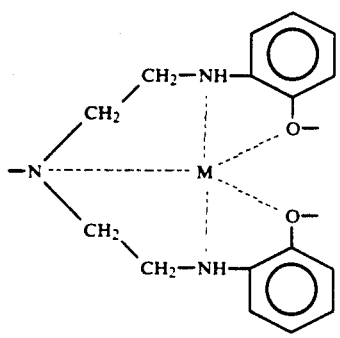
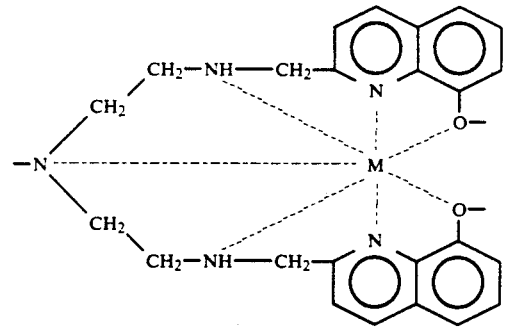
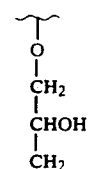
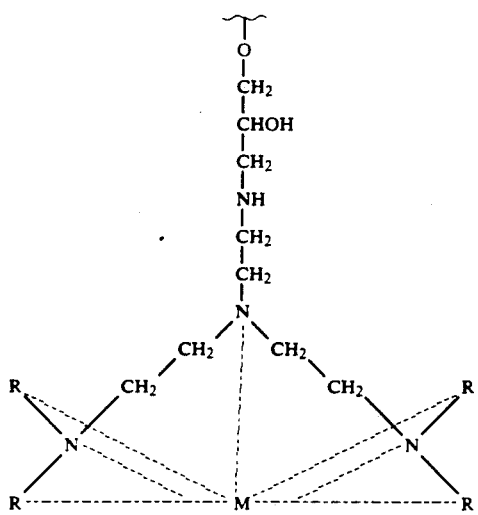
$R = (CH_2)_n-COOH$, n preferably 1 and 2.

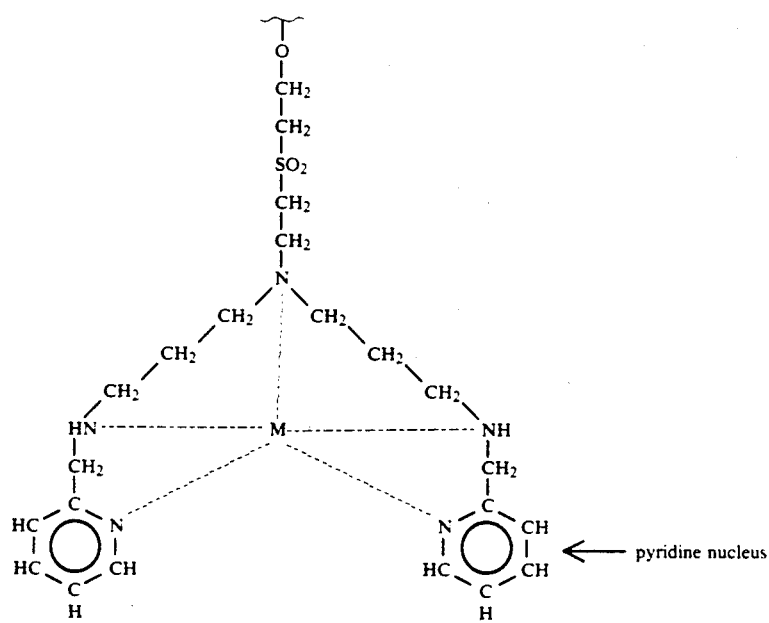
← pyridine nucleus
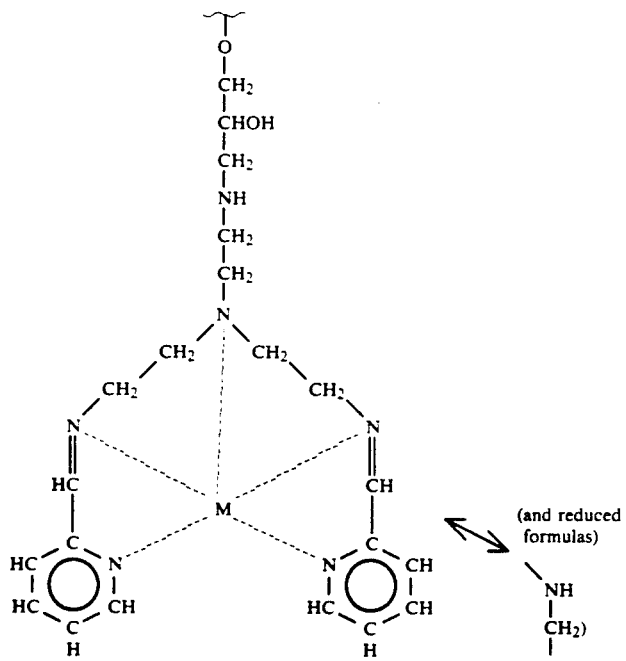
⟷ (and reduced formulas)

-continued
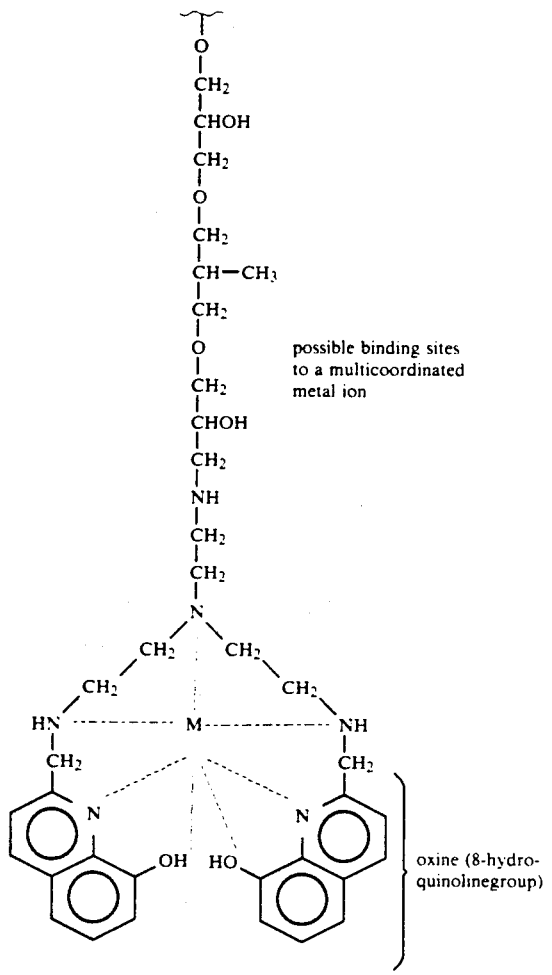
possible binding sites to a multicoordinated metal ion
oxine (8-hydroquinolinegroup)
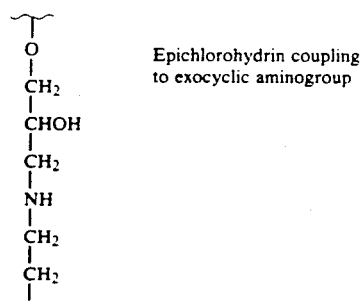
Epichlorohydrin coupling to exocyclic aminogroup

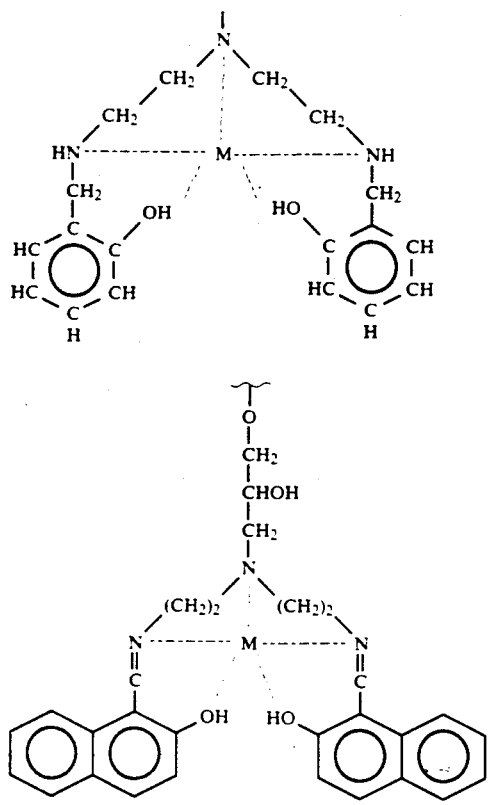

According to a variant of the invention the product contains macrocyclic ligands. "Doubled" chelating agents have not been described before, but on the other hand polymeric products with macrocyclic ligands where the polymer is pronouncedly hydrophobic (polystyrene) have been described by Cram and others. The hydrophilic character however is an essential characteristic of the product according to the invention, which concerns hydrophilic polymers containing hydroxyl, amino, amido, carboxyl or ether groups in the monomeric units which build up the polymer and thereby make it soluble or swellable in water. The product according to the invention which is insoluble in water thus can take up more than 50% by weight water, preferably more than 79% by weight, Cyclodextrins can be understood both as polymers and macrocyclic ligands. Cyclodextrins have been substituted by phthalocyanines and hemin-like ligands. These products are hydrophilic but inherently different from the present invention i.e. by the molecular mass, as the product according to the invention in all its variants has a molecular weight of more than 3 000 Daltons. If such cyclodextrin coupled metal chelating agents in turn are coupled to hydrophilic polymers with molecular weights exceeding 3 000 Daltons they are included as variants of the product according to the present invention.

The molecular weight 3000 Daltons is arbitrary but is chosen with respect to the properties of the unsubstituted polymer in the product according to the invention, which is intended to give the product properties making it especially suited for separation purposes based on selective extraction or adsorption. Therefore it is important to define the conception hydrophilic polymer apart from the molecular size.

According to a variant of the invention epoxy polymers, vinylsulfon polymers or aldehyde containing polymers are reacted with tris-(2-aminoethyl)-amin, e.g. in an alkaline solution, and then the formed product is condensed with a dialdehyde or a diketone.

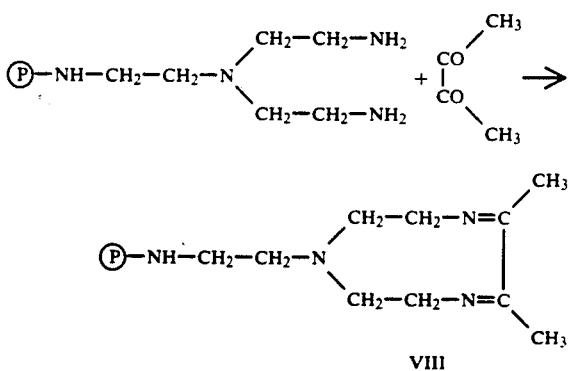

VIII

In all occuring cases the double bonds can be reduced e.g. by sodium boronhydride.

If the aminoligand is treated with a bifunctional "activator" such as epichlorohydrin, epibromohydrin, bisepoxide, bisisocyanate, divinylsulfone, etc. many end-products are obtained.

If the bifunctional reagent is added with low concentration and the ligand function of the polymer is low, the reaction is controlled mainly to a "short circuit" between the two aminogroups outermost on the fork, i.e. a ring is formed. A ring is also formed if condensation is made with a dialdehyde, diketone or a quinone. The most simple quinone thus can be condensed:

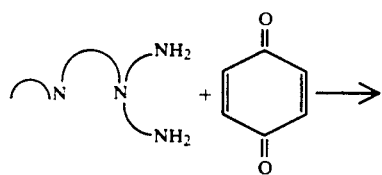

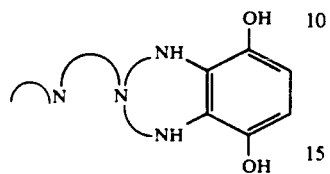

This group is presumably exceedingly interesting in other connections. It is easily oxidized to:

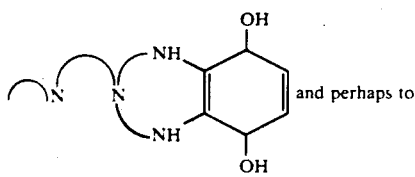 and perhaps to

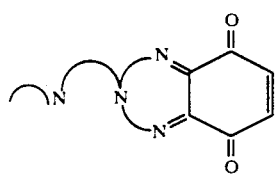

all of which can be reduced back. All the forms are able to bind $Cu^{2+}$. A strongly colored metal chelating ligand system is obtained with naphtazarin.

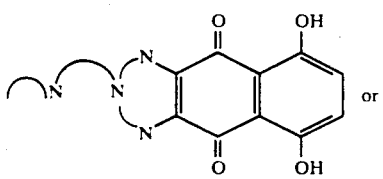 or

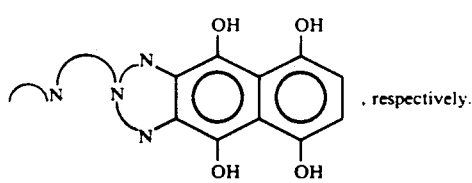, respectively.

A ring might be closed by heteromatic dialdehydes having the aldehyde groups closest to the heteroatom substituted, e.g.

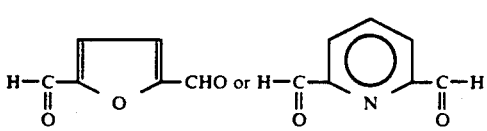

whereby one more coordinating atom is obtained in the chelating system.

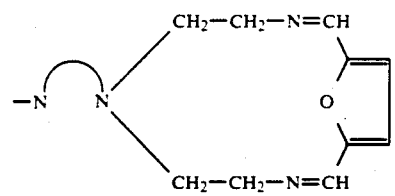

and after reduction

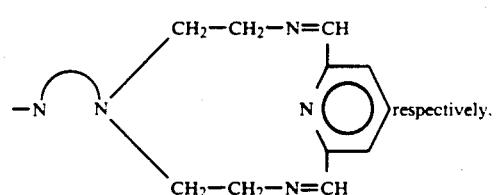

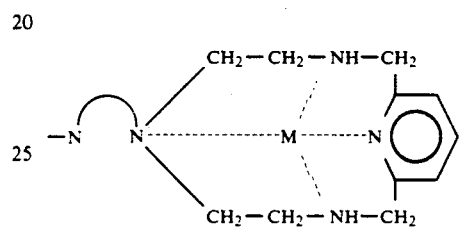

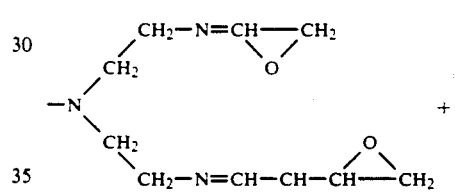

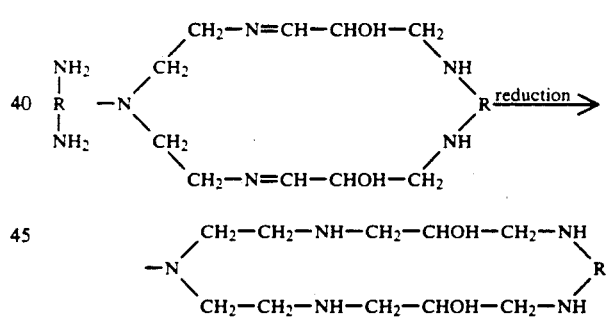

The macrocyclic ligand can be provided with a "handle", i.e. a side-arm with a primary amino group or a thiol group, e.g.

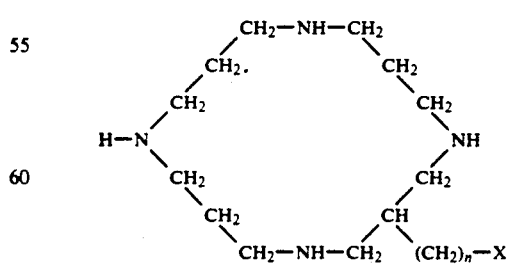

wherein X is $NH_2$ or SH and n is equal to 1, 2, ...

Such a macrocycle is more like the ligands obtained by bridging the distance between the primary amino groups in the "fork ligand" than the preformed macrocycles which are directly anchored in the polymer by the nitrogen in the ring.

Examples of ligands

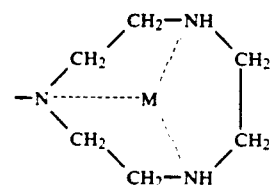

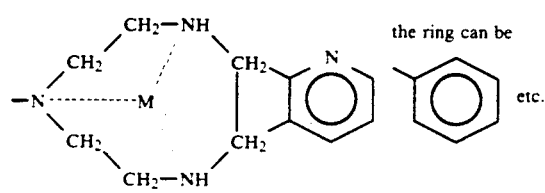

the ring can be etc.

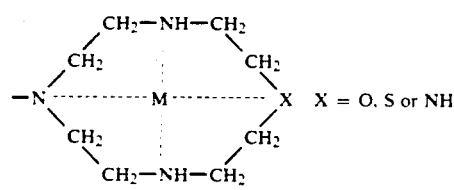

X = O, S or NH

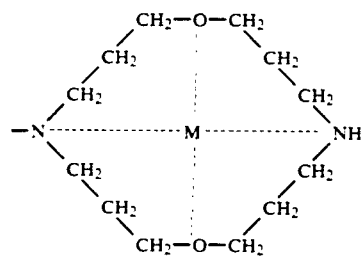

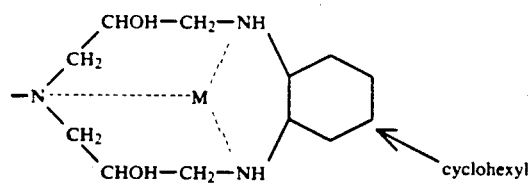

cyclohexyl

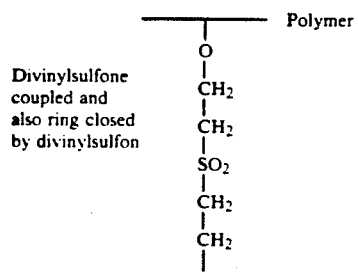

Divinylsulfone coupled and also ring closed by divinylsulfon

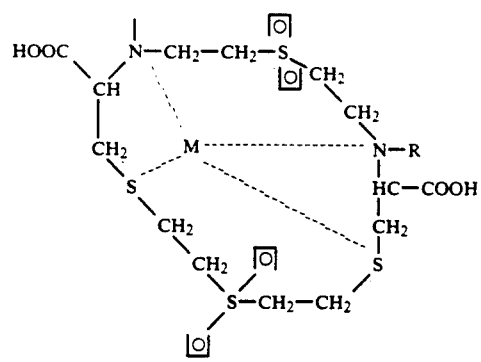

Macrocyclic ring produced from cystin, 18-ring with 6 heteroatoms 4 of which are sulfur.

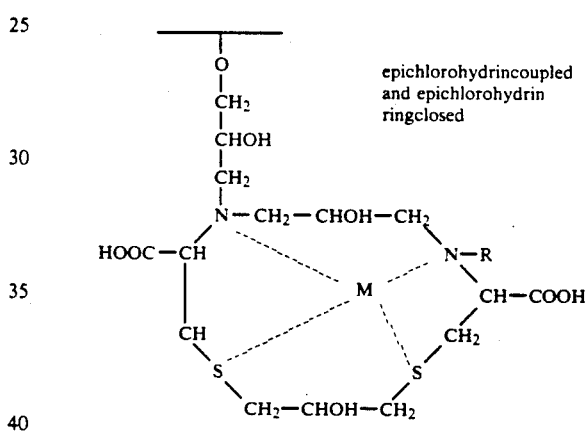

epichlorohydrincoupled and epichlorohydrin ringclosed 14-ring with 2S or 2N

>S forms fairly strong complexes only with so called soft metals, Hg$^{2+}$, platinum metals, silver and gold.

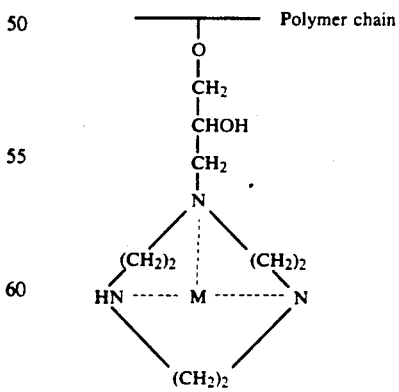

Bisepoxide directly coupled to macrocyclic ring nitrogen.

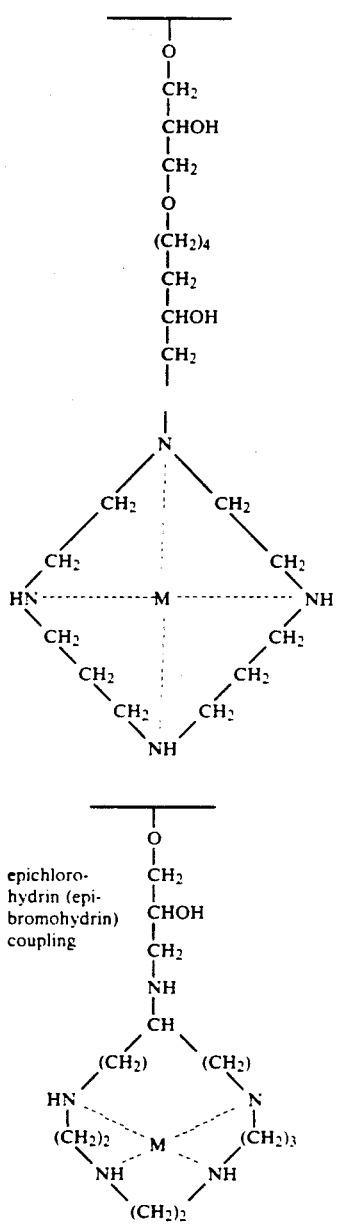

epichlorohydrin (epibromohydrin) coupling

Side chains in the ring may occur, e.g.

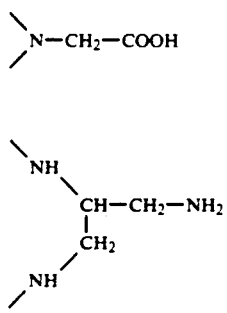

wherein COOH and $NH_2$ can strengthen the metal bindings.

EXAMPLE 1

10 g epoxidized polyacrylamide particles were suspended in 30 ml 33% ethylene glycol, 5 ml tris(2-aminoethyl)amin was added and the mixture was shaken for one hour.

The gel particles were collected in a Büchner funnel with a coarse glass disc and washed with great amounts of water alternating with 0.1M acetic acid. A small amount of the product was packed in a 1×5 cm bed to which was added a 0.05M copper sulfate solution. This front analysis showed an uptake of the gel of 60 μmol Cu per ml bed volume.

EXAMPLE 2

To 620 g agarose gel (Sephadex ® 6B) was added 130 ml water, 750 ml 2M $Na_2CO_3$, 0.6 g $NaBH_4$ and 75 ml divinylsulfone. The suspension was stirred over night at ambient temperature. The activated product was washed with water.

To 150 ml of the activated product was added 150 ml distilled water and 20 ml tris(2-aminoethyl)amin, pH was adjusted to 9.0 and the mixture was shaken at ambient temperature for 80 hours. The product was washed with great amounts of water.

To 50 g amino coupled gel was added 2 g salicylic aldehyde and 50 ml 0.1M sodium phosphate and was shaken over night. After washing the capacity of the product to take up $Cu^{2+}$, $Fe^{2+}$, $Fe^{2+}$, and $Ni^{2+}$ was tested. All ions were firmly adsorbed, and only a small amount was washed out by 1M glycine.

EXAMPLE 3

50 g divinylsulfone activated gel according to example 2 was mixed with 50 ml 0.2M sodium carbonate buffer adjusted to pH 9, 2.45 g cyclam was added and the suspension was allowed to stay 7 days whereafter the gel was sucked off on a filter and washed with water alternating with 0.1M acetic acid. The gel formed a purple, fixed copper complex.

EXAMPLE 4

10 g cotton was activated with 100 ml 0/6M NaOH and 30 g butandioldiglycidylether during 18 hours. Then the cotton was washed with water and thereafter with 0.1M sodium carbonate adjusted to pH 11.0. The cotton was suspended in 50 ml of this buffer, 1 g cyclam was added and after 3 days the gel was washed. Small samples were tested with $Cu^{2+}$, $Fe^{3+}$ and $Ni^{2+}$. The cotton was dyed respectively purple, yellow and green, and the color was resistant against 1M glycin and 0.01M EDTA.

EXAMPLE 5

5 g hydroxypropylated silica gel was activated with 5 ml divinylsulfone in 100 ml 0.1M $NaNCO_3$ for 18 hours with shaking at ambient temperature. The product was washed with water and the reacted with 2 ml tris-(2-aminoethyl)-amin in 20 ml water.

After 15 hours the silica gel was washed with water and thereafter with 0.1M sodium phosphate buffer. The gel was suspended in 20 ml of the buffer and 1 ml glutaraldehyde was added. After reaction 1 hour the gel was washed with great amounts of water.

The gel adsorbed copper, iron, nickel and cobalt ions firmer than aminogel which had not been treated with glutaraldehyde.

EXAMPLE 6

25 g tris(2-aminoethyl)-amin coupled agarose according to example 1 was treated with 8-hydroxyquinoline-2-carbaldehyde for 2 days at 50° C. in a 0.2M sodium phosphate buffer, pH 7.0. The product was washed and tested in respect of the capacity to adsorb copper and nickel ions, and a very strong adsorption was proved.

EXAMPLE 7

2 g polyvinylalcohol with an average molecular weight of 49 000 was dissolved in 50 ml 0.1M sodium bicarbonate and 0.5 ml divinylsulfone was added. After 1 hour the solution was neutralized and dialysed against 4 l water in two turns and a third turn against $NaHCO_3$.

To one half of the solution a) was added 0.2 g cyclam and to the other half b) was added 2 ml tris-(2-aminoethyl-amin. After one day the solution a) was dialysed against destilled water and b) against 0.1M phosphate. To b) was added 0.5 g alicylic aldehyde and after 5 hours the solution was dialysed against destilled water. To the solutions a) and b) then was added 2 ml 0.1M copper sulphate solution and they were dialysed again. After repeated dialysis the content in the dialysis sacks remained colored showing that the copper ions had been complex bound to the high polymeric polyvinylalcohol derivative.

EXAMPLE 8

A fork ligand with two amino groups was treated with 8-hydroxyquinoline-carbaldehyde in a mixture of ethyleneglycol and 0.1M $NaHCO_3$ with and without heating. This ligand with the plausible formula X will establish very strong complexes with cobalt, orange-red color, nickel orange-red, copper olive-green, and iron dark-brown.

EXAMPLE 9

From reaction of the simple fork ligand with 2-nitroso-1-naphthol in 0.1M $Na_2CO_3$ a yellow product was obtained which formed olive green complexes. By reduction with $NaBH_4$ the yellow color disappeared and a white or colorless gel was obtained. This gel also formed a dark green complex with two valent copper. Probably the ligand has the structure

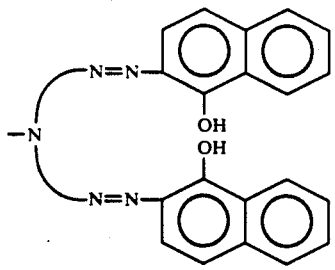

i.e. is an azoligand which by reduction is converted to a hydrazoligand. Even here thus there are two sterically rather like chelate formers which together form a strong, immobilized chelate. If the Cu-gel is sedimentated through a neutral 0.1M ECDTA solution, the solution remains uncolored, showing that the very strong complexes are not broken down.

I claim:
1. A hydrophilic polymer of the structure:

P—X—A—Q wherein:
P is a hydrophilic, soluble or insoluble polymer;
X is a heteroatom selected from the group consisting of O, S or N;
A is an atom sequence with at least 3 carbon atoms; and
Q is a group having at least 2 branches containing terminal metal chelate forming substituents, each branch comprising at least two heteroatoms, N, O or S, separated from each other by two or three carbon atoms in a sequence,
or Q is a macrocyclic ring having 8 to 30 atoms, at least 3 of which are nitrogen atoms.

2. Product according to claim 1, wherein the hydrophilic polymer is substituted with fork branched ligands each containing at least three aliphatically bound amino groups with the nitrogen atoms $N^1$, $N^2$ and $N^3$, where $N^1$ and $N^2$ are substituted with two or more of $R^1$, $R^2$, $R^3$ and $R^4$ with the formula

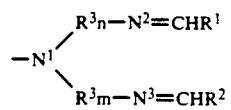

or

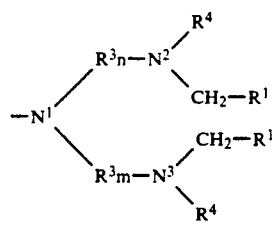

wherein $R^1$ and $R^2$ which can be the same, are substituents containing at least one coordinating N, O or S atom separated from $N^2$ and $N^3$ by two or three carbon atoms in a chain or a ring, $R^3$ is alkyl, carboxyalkyl or carboxyalkene, $R^4$ is H, alkyl or carboxyalkyl and n and m are 2, 3, 4 or 5.

3. Product according to claim 2, wherein $R^1$ and $R^2$ are carboxyl groups or —COOH and $R^4$ is a carboxy methyl group.

4. Product according to claim 2, wherein the fork formed ligands $R^1$ and/or $R^2$ contain an aromatic or heteroaromatic nucleus with carboxyl or phenol oxygen, or with an amino group separated from the closest nitrogen atom by two or three carbon atoms.

5. Product according to claim 2, wherein the fork formed ligand has the structure

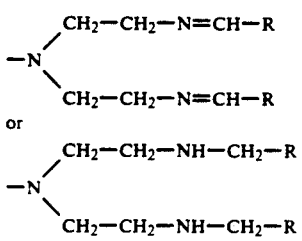

wherein R is an aromatic or heterocyclic ring system with at least one heteroatom in the ring or at least one OH or NH₂ group attached to an aromatic ring, and where these groups or ring heteroatoms are substituted in ortho position to the carbon atom between the nitrogen in the chain and the ring.

6. Product according to claim 2, wherein the fork formed ligands are ring closed by a bifunctional reagent to form a macrocyclic ligand with 8 to 30 carbon atoms and at least three nitrogen atoms, at least one of which is NH group in the ring, by reacting with epoxy or vinylsulfone polymer to

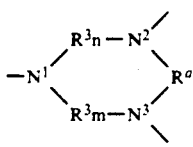

where $R^5$ is alkene, azaalkene, octaalkene or thiaalkene or derivatives thereof.

7. Product according to claim 1, wherein the hydrophilic, water soluble or insoluble polymer is polyhydric and is selected from the group consisting of polysaccharides and polyvinyl-alcohol.

8. Product according to claim 7, wherein the polyhydric polymer is agarose or agarose derivative.

9. Product according to claim 7, wherein the polyhydric polymer is cellulose or cellulose derivative.

10. Product according to claim 7, wherein the polyhydric polymer is polyalkene glycol, preferably polyethylene glycol.

11. Product according to claim 1, wherein the hydrophilic, water soluble or insoluble polymer is a polyacrylate or a polyacrylamide.

12. Product according to claim 1, wherein the product is in the form of particles, filtercloth, paper or cloth for metal ion uptake from solutions in adsorption beds.

13. Product according to claim 1, wherein the polymer has a molecular weight of more than 3 000 Daltons and is soluble with at least 1% by weight in water at 20° C.

14. Product according to claim 1, wherein the hydrophilic polymer is surrounding, or by adsorption of covalent binding is surface fixed to, an insoluble carrier material.

* * * * *